United States Patent

[11] 3,539,189

[72] Inventor Sylvester Martin Shelton
 San Antonio, Texas (905 B Richmond Road, China Lake, Calif. 93555)
[21] Appl. No. 694,777
[22] Filed Dec. 22, 1967
[45] Patented Nov. 10, 1970

[54] BOARD GAME APPARATUS
 14 Claims, 22 Drawing Figs.
[52] U.S. Cl. .................................................. 273/134
[51] Int. Cl. .................................................... A63f 3/02
[50] Field of Search ........................................... 273/134, 135

[56] References Cited
 UNITED STATES PATENTS
 1,013,161   1/1912   Hewitt .......................... 273/135
 1,523,615   1/1925   Stern ............................ 273/146
 1,555,447   9/1925   Bernstein ..................... 273/146
 2,673,738   3/1954   Jenkins ........................ 273/135
 3,163,423  12/1964   Jackson ....................... 273/134
 3,254,894   6/1966   Kollmeyer et al. ........... 273/135

Primary Examiner—Delbert B. Lowe
Attorney—Milmore and Cypher

ABSTRACT: A game apparatus comprising a board with a continuous path divided into consecutive spaces for occupancy by tokens advanced randomly, the spaces having play instructions, a plurality of fields with indicia representing economic indicators (e.g., commercial loans, freight car loadings, investor's confidence) with indicia and designators showing whether they are up, down or even, a field showing margin requirements with indicia and a designator, a supply of property cards (e.g., stock certificates, warrants, bonds, and short sales slips), imitation money, a chart bearing price factors for different conditions applicable to various properties, a deck of Opportunity cards and a deck of News Release cards (all cards bearing instructions), and four random selectors, e.g., dice, for determining respectively (a) the token movements (b) changes in the indicators, (c) multipliers for the price change factors, and (d) specific properties involved in a price change or other play.

Patented Nov. 10, 1970

INVENTOR:
SYLVESTER MARTIN SHELTON
BY: Wilmore & Cypher
HIS ATTORNEYS

| ECONOMIC PICTURE | PRICE FACTORS | | |
|---|---|---|---|
| | CONSERVATIVE  A - R - MGP | MODERATE RISK  C - DM - RC  RPG - SA | HIGH RISK  ACL - GU  S - X |
| +10 | +5 | +7 | +9 |
| +9 | +4 | +6 | +8 |
| +8 | +4 | +5 | +7 |
| +7 | +3 | +5 | +7 |
| +6 | +3 | +4 | +6 |
| +5 | +2 | +4 | +5 |
| +4 | +2 | +3 | +5 |
| +3 | +2 | +3 | +4 |
| +2 | +1 | +2 | +2 |
| +1 | +1 | +1 | +2 |
| 0 | +1 | +1 | +1 |
| -1 | -1 | -1 | -2 |
| -2 | -1 | -2 | -2 |
| -3 | -2 | -3 | -4 |
| -4 | -2 | -3 | -5 |
| -5 | -2 | -4 | -6 |
| -6 | -2 | -4 | -6 |
| -7 | -3 | -5 | -7 |
| -8 | -4 | -5 | -7 |
| -9 | -4 | -6 | -8 |
| -10 | -5 | -7 | -9 |

(BULL MARKET: +1 to +10; BEAR MARKET: -1 to -10)

FIG. 5

| IF THE SECURITIES PRICE IS BETWEEN | THE PRICE CHANGE IS* | FOR EACH BLOCK OF |
|---|---|---|
| $1.00 - 25.00 | $1.00 | 500 SHARES |
| $26.00 - $100.00 | $1.00 | 300 SHARES |
| $101.00 - UP | $1.00 | 200 SHARES |

FIG. 6   * + FOR BUY  − FOR SELL

| SECURITIES PRICE BOARD | | |
|---|---|---|
| ACL | $150 | |
| ACL 6% cv. Pfd | $100 | |
| A | $50 | |
| A 5% Bond | $100 | |
| C | $60 | |
| DM | $80 | |
| GU | $60 | |
| R | $55 | |
| MGP | $45 | |
| RC | $90 | |
| RPG | $65 | |
| S | $85 | |
| SA | $100 | |
| X | $125 | |
| X wrts. | | |

FIG. 7

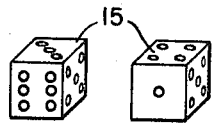

FIG. 8

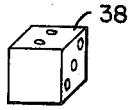

FIG. 9

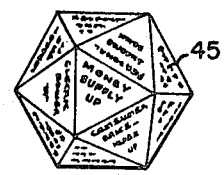

FIG. 10

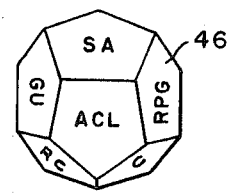

FIG. 11

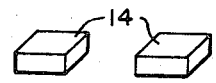

FIG. 12

INVENTOR:
S. MARTIN SHELTON
BY: Milmore & Cypher
HIS ATTORNEYS

RPG
ROYAL PETROLEUM & GAS LTD.
100 SHARES COMMON

THIS CERTIFICATE PAYS $250.00 DIVIDEND (47)

SHORT SALES
CORPORATION _____
NO. OF SHARES _____
PRICE / SHARE _____

TOTAL MONEY RECEIVED $_____

(48)

PUT
CORPORATION _____
100 SHARES
PRICE / SHARE $_____

OPTION (50, 49)

CALL
CORPORATION _____
100 SHARES
PRICE / SHARE $_____

OPTION (52)

INVENTOR:
SYLVESTER MARTIN SHELTON

Patented Nov. 10, 1970  3,539,189

YOU MAY BUY A PUT OR CALL OPTION ON ANY CORPORATION AT 10% OF CURRENT PRICE — 40a

FIG. 19

YOU MAY BUY A STRADDLE OPTION ON ANY CORPORATION AT 20% OF CURRENT PRICE — 40b

FIG. 20

CHANGE ONE (1) ECONOMIC INDICATOR OF YOUR CHOICE — 40c

FIG. 21

| SECURITY | NO. SHARES | PRICE PER SHARE | TOTAL COST | AM'T. PAID | MARGIN (OWED) | SUBJECT TO INTEREST ||
|---|---|---|---|---|---|---|---|
| | | | | | | SHORT SALES | CUMULA-TIVE |
| | | | | | | | |
| | | | | | | | |
| | | | | | | | |
| | | | | | | | |

3 — MARKET CHANGE FOR A-R-MGP  Use Economic Picture of -1

4 — ECONOMIC INDICATOR

5 — YOUR SHORTS ARE CALLED!

12

13

6 — TOTAL MARKET CHANGE  Use Current Economic Picture

7 — NEWS RELEASE

8 — ECONOMIC INDICATOR

9 — OPPORTUNITY

INVENTOR:
SYLVESTER MARTIN SHELTON
BY: *Milmore & Cypher*
HIS ATTORNEYS

BOARD GAME APPARATUS

The invention relates to game apparatus which can be played by one or more persons, up to ten or so, which involves both an element of chance and an element of skill or astuteness and which is based on changes in the values of properties in accordance with variable conditions. More particularly, the apparatus comprises, basically, a game board with a continuous path subdivided into spaces each bearing a play instruction, fields for each of several variable indicators, and a chart (which may be printed on the board or be separate therefrom) bearing price parameters for different properties in accordance with conditions determined from the variable indicators; other items to be used with these basic elements will be described hereinafter.

In a specific embodiment, the properties are securities, such as common or preferred corporate stock, corporate warrants and bonds, the variable conditions are economic indicators and the price parameters are factors which, when multiplied by a randomly selected number, yield the changes in the prices of the securities, and the transactions resemble those in the stock market. The securities are bought and sold, either for simulated cash or on margin. However, the invention may be otherwise embodied, and the properties may represent real estate or race horses, etc., and the transactions may resemble other commercial actions or sporting events, the meanings of the indicators and other instructions being suitably modified to conform to the properties represented and the nature of the transactions simulated.

The game is for amusement as well as educational in that it teaches the art of dealing in securities or conducting other transactions, depending upon the properties, indicators, and conditions represented.

Among the objects are to provide a challenging and educational game apparatus comprising a game board and including, in association therewith, means for representing the mode of change in the conditions of several variable indicators and for determining price parameters for various properties on the basis of the conditions of these indicators.

A related object is to provide means for altering the conditions of the variable indicators randomly and for changing the values of the properties in accordance with the altered conditions of the several indicators, in a manner to teach children and adults the significance of such indicators with respect to prices.

Another related object is to provide means, such as a deck of Opportunity cards, which give the player drawing the card specific benefits or choices, to teach the significance of such opportunities; for example, when the stock market is represented, such cards may inform the player of a benefit, such as the acquisition of a right, a dividend, etc.

Another related object is to provide means, such as a deck of News Release cards, which bear instructions giving changes in the values of properties, to teach the effect of such news on prices.

Still another object is to provide a game apparatus that permits a great variety of plays or events, representative of most transactions and effects commonly encountered in the represented activity, in a manner to teach their relationship; for example, if the stock market is represented, the game may permit several or all of such actions as the following nonexhaustive list: buying and selling, either long or short, for cash or on margin, of stock, warrants, bonds, puts and calls, paying interest on borrowed money, paying money on covering short sales or for margin calls, receiving new stock in the event of a stock split or a conversion of a security or receiving money for dividends or the maturity of a security.

Still another optional object is to provide a game apparatus in which the prices of properties can be altered in accordance with transactions involving those properties.

Still another optional object relates to providing specific means for randomly selecting numbers or specific properties or changes in the conditions of the indicators.

Additional objects will appear from the detailed description which includes the annexed drawings illustrating, by way of example, a specific embodiment applied to stock market transactions, wherein:

FIG. 5 is a plan of the chart of price parameters;

FIG. 6 is a plan of the chart of price changes due to trading;

FIG. 7 is a plan of a chart listing securities and providing space for the entry of their prices;

FIG. 8 is an isometric view of a pair of dice for determining the movement of the tokens;

FIG. 9 is an isometric view of the price change die for use in determining the changes in prices of securities;

FIG. 10 is an isometric view of the economic indicator die for selecting a change in an economic indicator;

FIG. 11 is an isometric view of the corporation die for selecting a specific security;

FIG. 12 is an isometric view of two tokens;

FIG. 18 is an enlarged view of a portion of the game board of FIG. 1, showing some of the indicia in the spaces representing plays;

FIGS. 19, 20 and 21 are plans of typical action cards, also called "Opportunity Cards"; and FIG. 22 is a fragmentary plan of a player's account form.

Figure 1:
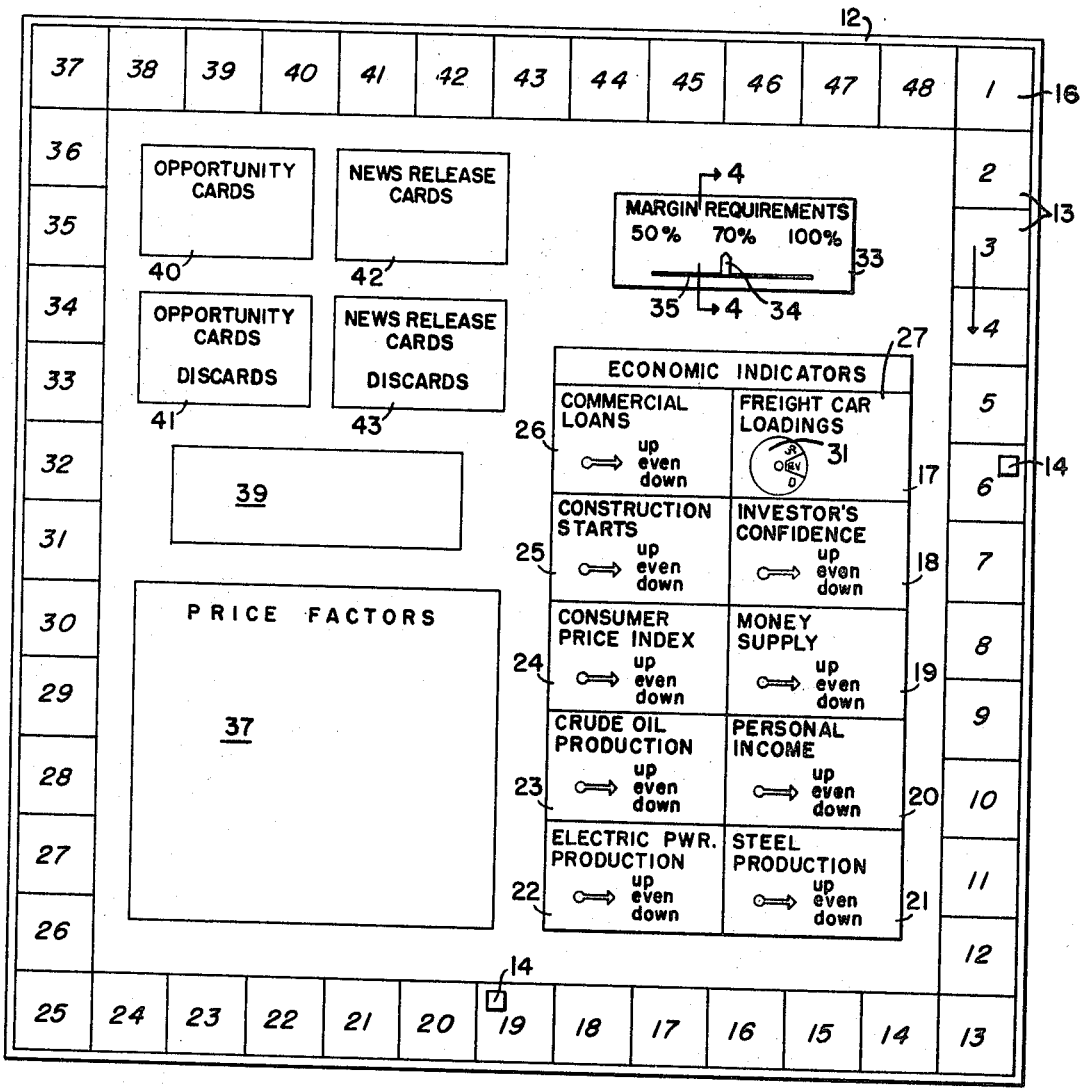
FIG. 1 is a plan of a game board, certain details and indicia being omitted and most economic indicators being shown diagrammatically.

Referring to the drawings, the game board 12 shown in FIGS. 1—4 and 18 has a continuous path subdivided into consecutive spaces 13, each adapted to bear one or more tokens 14 (FIG. 12) and each bearing indicia representing plays to be made. The last space is adjacent to the first. There is one token for each player, the tokens being of different colors and/or shapes, and are advanced in accordance with the number thrown by a player whose turn it is, who uses a pair of common dice 15 (FIG. 8), so that each token is advanced by a randomly determined number of steps from 2 through 12. Although any number of spaces 13 may be used, it was found convenient to provide 48 spaces, the initial space being indicated at 16, and progressing in a clockwise direction. The indicia in these spaces, only some of which are shown on the drawing, are selected as desired, and may be as follows:

TABLE I.—PLAYS REPRESENTED IN THE PATH

| Space: | Indicia |
|---|---|
| 1 | THE EXCHANGE—Collect dividends and pay interest. |
| 2 | New Release. |
| 3 | Market Change for A-R-MGP. Use economic picture of −1. |
| 4 | Economic Indicator. |
| 5 | Your Shorts are Called! |
| 6 | Total Market Change. Use current economic picture. |
| 7 | News Release. |
| 8 | Economic Indicator. |
| 9 | Opportunity. |
| 10 | Market Change for ACL-GU-S-X. Use economic picture of +3. |
| 11 | News Release. |
| 12 | Market Change for C-DM-RC-RPG-SA. Use economic picture of −2. |
| 13 | You must sell, at current market price, 100 shares common stock. Toss Corporation Die until a corporation you own stock in appears, and sell this stock. |
| 14 | Economic Indicator. |
| 15 | Your margins are called! |
| 16 | News Release. |
| 17 | Total Market Change. Use current economic picture. |
| 18 | Opportunity. |
| 19 | News Release. |
| 20 | Market Change for A-R-MGP. Use current economic picture. |

TABLE I.—PLAYS REPRESENTED IN THE PATH—Con.

| Indicia | |
|---|---|
| Space: | |
| 21 | News Release. |
| 22 | Stock Split, 2 for 1 for first four (4) corporations which appear on the Corporation Die if the current price is at least twice the opening price. |
| 23 | Economic Indicator. |
| 24 | Market Change for ACL-GU-S-X. Use current economic picture. |
| 25 | Pay Broker's Fee. $1.00 per share and warrant and $5.00 per bond. |
| 26 | Total Market Change. Use current economic picture. |
| 27 | News Release. |
| 28 | Opportunity. |
| 29 | Economic Indicator. |
| 30 | Your PUT and CALL OPTIONS. Expire after this turn! |
| 31 | News Release. |
| 32 | Market Change for C-DM-RC. Use economic picture of +2. |
| 33 | Economic Indicator. |
| 34 | Total Market Change. Use current economic picture. |
| 35 | Opportunity. |
| 36 | Market Change for A-R-MGP. |
| 37 | Pay Income Tax. $3,000.00 or 10% of total current worth whichever is less. |
| 38 | Economic Indicator. |
| 39 | News Release. |
| 40 | Your XENO Warrants will expire after this turn! |
| 41 | Opportunity. |
| 42 | Market Change for ACL-GU-S-X. Use economic picture of −3. |
| 43 | News Release. |
| 44 | Total Market Change. Use current economic picture. |
| 45 | Economic Indicator. |
| 46 | News Release. |
| 47 | Market Change for C-DM-RC-RPG-SA. Use current economic picture. |
| 48 | Reverse Stock Split, 1 for 2 for first four (4) corporations which appear on the Corporation Die if the current price is ½ of the opening price or less. |

The board has a plurality, e.g., ten, economic indicator fields 17—26, inclusive, each bearing indicia denoting a different indicator and additional indicia showing conditions which represent modes of change in the indicator. The indicators may, for example, be: Freight Car Loadings, Investor's Confidence, Money Supply, Personal Income, Steel Production, Electric Power Production, Crude Oil Production, Consumer Price Index, Construction Starts and Commercial Loans. The indicia denoting modes of change may be variable as to number and names; and in the embodiment shown each field contains three such indicia, respectively "UP" "EVEN" and "DOWN".

Figure 3:
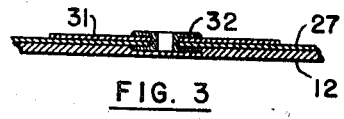
FIG. 3 is a fragmentary section, taken on the line 3–3 of FIG. 2.
Figure 4:
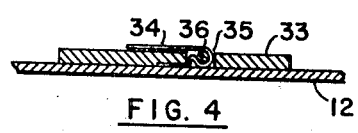
FIG. 4 is a section, taken on the line 4–4 of FIG. 1, on an enlarged scale.
Figure 2:
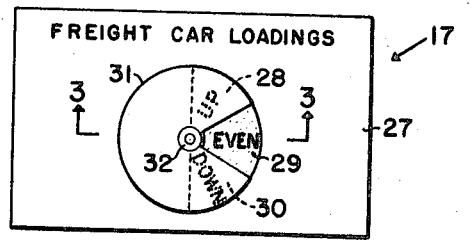
FIG. 2 is a plan of one of the economic indicator fields, on an enlarged scale.

As appears in FIGS. 2 and 3, the indicator fields may include a board 27 which is secured to the base board 12 and bears the three indicia 28, 29 and 30 in sector-shaped subfields, which may have backgrounds of different colors. Corresponding sectors in the several fields 17—26 have like colors. An adjustable designator means to designate any one of the indicia is provided. This may be a disc 31 having a recess shaped to expose one of the three subfields and which is rotatably mounted on the board 27 by a plastic ferrule 32.

Optionally, the board includes a Margin Requirement Field, e.g., on a field board 33 having indicia of the currently prescribed minimum margin requirements, e.g., 50 percent, 70 percent, and 100 percent (of the purchase price) which is the prescribed partial payment, and adjustable designator means, such as a slidable pointer 34, for designating one of the indicia. As appears in FIG. 4, the pointer may consist of a band of metal bent on itself and extending through a slit 35 in the field board 33. If desired, the metal band can be crimped about a stiff wire 36 for sliding movement thereon.

The chart of price parameters, shown at 37 in FIG. 5, may be printed on the board 12 but may be separate therefrom. In the embodiment shown, it presents, for each of three groups of securities of different volatilities or risks, (marked "Conservative", "Moderate Risk" and "High Risk", respectively) price factors which, when multiplied by a number determined at random by a random number generator, yields the change in the price of the security. However, the game is not limited to the use of such factors, and the chart 37 may present parameters which are in themselves the price changes or from which the price changes can be obtained in any desired manner. Also, while the securities are classified into three groups, this is not restrictive of the game.

As shown, the chart 37 presents in the last three columns price factors for each of a plurality of economic conditions, labelled "Economic Picture", numbered consecutively from +10 through −10 in the first column. Twenty-one conditions are represented, of which the first ten are for a "Bull Market", one is neutral, and the last ten are for a "Bear Market". The current economic picture to be selected is obtained by adding the conditions of the economic indicators in the fields 17—26, counting a plus 1 for each UP, zero for each EVEN and minus 1 for each DOWN. The factor of the appropriate one of the last three columns is multiplied by a number, such as that randomly determined by the die 38 shown in FIG. 9, which may be a six-faced die having a blank face and its other faces having dots up to 5, so that a number between 0 (represented by the blank face) and 5 can be generated.

Optionally, there may be (on the board 12 or separate from it) a chart 39, such as that shown in FIG. 6, showing changes in the price of securities resulting from transactions involving a large volume, e.g., 200 or more shares. The chart has three columns, of which the first gives ranges of security prices, the second the change in the price (positive when a player buys and negative when a player sells a security) and the third column the size of the transaction. For example, if 600 shares of a stock with a price of $30.00 a share were purchased, the price would advance to $32.00 a share.

The board has a pair of fields 40 and 41 for action cards. In the embodiment described, these action cards, of which only three representative cards 40a, 40b, and 40c are shown in FIGS. 19, 20 and 21 of the drawings, are called "Opportunity" cards and bear that word on the reverse, a deck of such cards, say two or three dozen in number, e.g., 30, being placed face down within the field 40 and discarded cards being placed into the field 41. The obverse of each card presents information regarding an economic event which is usually advantageous to the player; for example, it may grant the player a right or a privilege. However, as is evident from the examples of cards numbers 8 and 15, the event may be disadvantageous. Typical information on the obverse sides of these cards is given in table II. Usually only one of each card is included in the deck but, in some examples, marked with numbers in parentheses, several like cards are included:

TABLE II.—CONTENTS OF OPPORTUNITY CARDS

| Information | |
|---|---|
| Card No.: | |
| 1 | You may buy a put or call option on any corporation at 10% of current price. (4). |
| 2 | You may buy a straddle option on any corporation at 20% of current price. (2). |
| 3 | Change one (1) economic indicator of your choice. (2). |
| 4 | Change two economic indicators of your choice. |
| 5 | Save this card—You may buy or sell (long or short) at any time—Place this card into the discard stack when used. (2). |
| 6 | Save this card—You may sell short at any time—Place this card into the discard stack when used. |
| 7 | I.R.S. finds error in your Income Tax Return. Receive from bank $1,000. |
| 8 | I.R.S. finds error in your Income Tax Return. Pay Bank 1,000. |
| 9 | Margin purchases now require 50% cash if economic picture is in a bull market of +3 or greater. |
| 10 | Margin purchases now require 100% cash if economic picture is in a bear market or −3 or lower. |
| 11 | Margin purchases now require 70% cash if economic picture is between −3 and +3. |
| 12 | American Communications Co. Inc. (A) declares extra dividend of $2.00 per share. |
| 13 | Inter-State Railroad Inc. (R) declares extra dividend of $2.00 per share. |
| 14 | Merger talks have begun between Amalgamated Conglomerate Ltd. (ACL) and (select any one of the following corporations by the Corporation Die): GU-RC-RPG-SA-S. Price of ACL is UP 7. Price of (selected corp.) is UP 11. |
| 15 | Merger talks called off between Amalgamated Conglomerate Ltd. (ACL) and (select any one of the following corporations by the Corporation Die): GU-RC-RPG-SA-S. Price of ACL is Down 11. Price of (selected corp.) is DOWN 20%. |

TABLE II.—CONTENTS OF OPPORTUNITY CARDS — Con.

| Card No.: | Information |
|---|---|
| 16 | Xeno (X) issues warrants. Opening price is $80 less than the price of the common stock. If the common stock price is $80 or less, the warrant price is $10. |
| 17 | If the stockholders so vote, ACL acquires one of the following corporations selected by the Corporation Die: GU–RC–RPG–SA–S. ACL issues 6% convertible Pfd. stock. Stockholders of acquired corp. receive 100 shares of ACL Pfd. for each 100 shares of common of acquired corporation. Price of ACL is UP 17. |
| 18 | ACL calls 6% convertible Preferred Stock before maturity date. Redemption price is ¾ times current price of ACL common, but not less than $75 per share; or the shareholders of the Preferred Stock may exercise the conversion option. |
| 19 | You may purchase 100 shares of the corporation determined by the Corporation Die at $5.00 per share below the current market price, but not at a price less than $5.00 per share. You cannot sell during this turn. |
| 20 | Advance to any space on the board. You must pass "THE EXCHANGE" and carry out the instructions on the new square. |

It will be understood that the foregoing are merely exemplary of the Opportunity cards, and that additional cards, differing, for example, in the name or names of corporations or in the rights granted may be included.

The board further has a pair of fields 42 and 43 for News Release cards, which are not shown in the drawings. A deck is placed face down in the field 42 and discards are placed into the field 43. There may, typically, be from fifty to one hundred-fifty News Release cards, e.g., 85, all of a color different from the action or "Opportunity" cards, and bearing the legend "NEWS RELEASE" on the reverse side. A wide variety of news items may be placed on the obverse sides of different cards, together with the effect of such news on the price of specified stocks. No attempt will be made herein to give the news items of more than a small number of representative cards, it being evident that such news can be selected almost as desired. However, it is desirable to select the news in a manner to balance "bearish" and "bullish" information, so that the players cannot foretell the trend of a game. Examples of news releases are given in table III:

TABLE III.—TYPICAL NEWS RELEASE ITEMS

| Card No.: | News Release |
|---|---|
| 1 | The President proposes an income tax reduction. All stock prices advance 5%. |
| 2 | The President proposes an income tax boost. All stock prices drop 5%. |
| 3 | The Atomic Energy Commission prohibits civilian development by Giant Uranium Mines Ltd. of new uranium extraction process. GU stock: −3. |
| 4 | Government decries steel price increase by Carborundum Steel Co., Inc. C stock: −4. |
| 5 | Market for rare earth metals falls as South Africa imports undercut Giant Uranium Mines Ltd.'s American market. GU stock: −7. |
| 6 | Giant Uranium Mines Ltd. expands operations into rare earth metals. GU stock: +8. |
| 7 | Semi-Conductor Electronics Co., Inc., is awarded Government contract for sophisticated electronic device. S stock: +7. |
| 8 | Amalgamated Conglomerate Ltd. announces development of revolutionary new wigit device. ACL stock: +20. |
| 9 | Amalgamated Conglomerate Ltd. is way over contract estimates on new aerospace contract. ACL stock: −11. |
| 10 | N.L.R.B. allows Inter States Railroad Inc. to drop a coal shoveller from diesel engine crew. R stock: +3. |
| 11 | Detroit Motors Inc. outpaces all competition in sales this year. DM stock: +4. |
| 12 | Research Chemical Co., Inc.'s industrial chemical division's profits increase as planting season hits its peak. RC stock: +4. |
| 13 | Inter States Railroad Inc.'s computer in new automated switching yard goes berserk. Estimated two weeks to unsnarl jam. R stock: −3. |
| 14 | Royal Petroleum & Gas Ltd. makes huge oil field in Baroda. RPG stock: +4. |
| 15 | Semi-Conductor Electronics Co., Inc.'s electrical appliance division develops short circuit in new color TV tube. S stock: −5. |
| 16 | Research Chemical Co., Inc.'s new cleaning agent dissolves White House steps. RC stock: −4. |
| 17 | Carborundum Steel Co., Inc. expands by developing new rolling mill facility. C stock: +4. |

TABLE III.—TYPICAL NEWS RELEASE ITEMS — Con.

| Card No.: | News Release |
|---|---|
| 18 | Detroit Motors Inc. comes under severe attack by crusading author who decries auto safety. DM stock: −5. |
| 19 | Xeno's new instant "3-d" color camera hits the market. X stock: +9. |
| 20 | Xeno's chief competitor announces new Mylarbased photographic film. Xeno's stock drops. X stock: −5. |
| 21 | American Communication Co., Inc., expands into new territory. A stock: +4. |
| 22 | Supersonic Airways Inc. announces opening of new route between Baluchistan and McCurdo Sound. SA stock: +7. |
| 23 | Metropolitan Gas & Power, Inc.'s new nuclear reactor runs away and melts to the ground. MGP stock: −4. |
| 24 | Xeno's board of directors vote new stock options for themselves. X stock: −5. |
| 25 | Supersonic Airway's Freight Service Division loses lucrative government contract to Wagons West Inc. SA stock: −11. |
| 26 | Australian uranium ore recently discovered by Giant Uranium Mines Ltd. proves to be of very low grade and uneconomical to mine. GU stock is halved in price! |

FIG. 7 shows the Securities Price Board 44 which preferably has a surface on which numbers can be entered in an erasable manner, e.g., by a grease pencil or by chalk; however, it may consist of a pad of paper sheets to be used one for each game. The board 44 may be of sufficient size to be seen by all of the players when mounted on a wall. It lists, in the first column, the ticker tape abbreviations of all securities used in the game, e.g., the common stocks of twelve corporations, one 6 percent convertible preferred stock, one 5 percent bond, and warrants, respectively issued by the companies indicated. The second column gives the starting prices of these securities, i.e., their prices at the start of the game or when issued. Following each entry, there is a series of squares in which current market prices can be entered.

The economic indicator die is used to select at random a change in a selected variable indicator 17—26. It is in this embodiment, a regular icosahedron 45 (a solid having twenty faces, each of which is an equilateral triangle), as shown in FIG. 10. Each pair of opposite faces relate to the same economic indicator, one face being marked "UP" and the other "DOWN"; and each different pair of opposite faces relates to a different economic indicator. Thus, one face is marked "FREIGHT CAR LOADINGS UP" and the face opposite thereto is marked "FREIGHT CAR LOADINGS DOWN"; another face is marked "INVESTOR CONFIDENCE UP" and the face opposite thereto is marked "INVESTOR CONFIDENCE DOWN". In this manner two faces refer to each of the ten economic indicators appearing in the fields 17—26.

The corporation die is used to select at random one of the properties. It is, in this embodiment, a regular dodecahedron 46 (a solid having twelve faces, each of which is a regular pentagon), as shown in FIG. 11. Each of the twelve faces is marked with different indicia, identifying a specific property, e.g., the ticker tape symbol for one of the twelve corporations. Thus, one face is marked ACL, another A, still another C, etc.

All dice of FIGS. 8—11, inclusive, may be made of hard material, such as plastic or wood, preferably having a uniform density so that the probability of any one face being uppermost after the die is thrown is the same for all faces. Although the dice shown are preferred in the present concept of the game, it is evident that other random selectors may be used, such as rotatable wheels or pointers that can be spun on a spindle and give a number, or a change in an indicator, or identify a property, by its position of rest.

Figures 13, 14, 15, 16, 17:
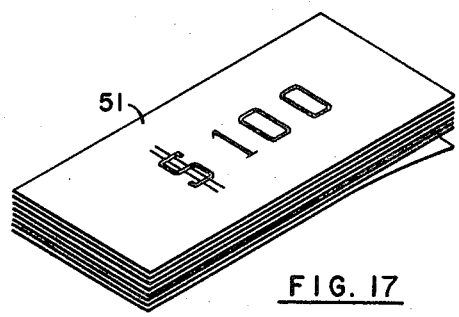
FIG. 13 is a plan of a typical stock certificate card.
FIG. 14 is a plan of a typical short sale card.
FIG. 15 is a plan of a typical PUT card.
FIG. 16 is a plan of a typical CALL card.
FIG. 17 is an isometric view of a supply of imitation money.

The game apparatus includes further sets of cards identifying each of the different properties, viz., the securities in the embodiment being described. Only one representative card 47 is shown in FIG. 13. This card is for 100 shares of common stock of Royal Petroleum & Gas Ltd. and indicates the dividend rate. There may, for example, be two or three dozen such cards, some made out for larger numbers of shares, such as 200, 500, 1,000 and 5,000. A similar set of cards is provided for each of the eleven other common stocks, the preferred stock, the bond, and the warrants, as shown in table IV

TABLE IV

CORPORATION SUMMARY SHEET

| Ticker Symbol | Corporation name | Earnings, Dollars | PE, ratio | Dividends, Dollars | Yield, percent | Opening price, Dollars |
|---|---|---|---|---|---|---|
| ACL | Amalgamated Conglomerate Ltd. (common) | 3.00 | 50 | 0 | 0 | 150 |
|  | Amalgamated Conglomerate Ltd., (common), 6% convertible preferred (2 shs. cv. pfd.for 1 sh. common). Expires when called. |  |  | 6.00 | 6 | 100 |
| A | American Communications Co. Inc. (Common) | 4.00 | 12.5 | 2.00 | 4 | 50 |
|  | American Communications Co. Inc., (Common), 5% Bond-AAA rated Matures at end of game. |  |  | 5.00 | 5 | 100 |
| C | Carborundum Steel Co., Inc | 3.75 | 16 | 2.50 | 4.2 | 60 |
| DM | Detroit Motors Inc | 5.25 | 15.3 | 4.00 | 5 | 80 |
|  | Mines, Ltd | 2.00 | 30 | 0 | 0 | 60 |
| R | Inter States Railroad, Inc | 5.50 | 10 | 3.00 | 5.5 | 55 |
| MGP | Metropolitan Gas & Power Co., Ltd | 2.65 | 17 | 2.00 | 4.5 | 45 |
| RC | Research Chemical Co., Inc | 4.90 | 18.4 | 3.00 | 3.3 | 90 |
| RPG | Royal Petroleum & Gas Ltd | 5.00 | 13 | 2.50 | 3.9 | 65 |
| S | Semi-Conductor Electronics Co., Inc | 2.75 | 31.1 | 1.00 | 1.2 | 85 |
| SA | Supersonic Air-Ways, Inc | 2.75 | 23.8 | 2.00 | 3.1 | 65 |
| X | Xeno Dup. & Photo Co., Inc | 3.65 | 34.4 | 2.00 | 1.6 | 125 |
|  | Xeno Dup. & Photo Co., Inc., Warrants—(1 warrant plus $80 for 1 share common) Expires when called. |  |  |  |  |  |

Each player may be given a sheet like table IV, for reference and to guide his selections.

The numbers of these cards may be limited to confine the aggregate number of shares in each issue to the number likely to be bought by the players only when there is great interest in that issue. Such a number varies with the price.

FIG. 14 shows a typical Short Sale card 48. Again, there may be a set of cards for each security; however, since short sales occur less frequently than purchases, it is convenient to make all of the cards 48 alike, and provide blank spaces to be filled in by the broker when a short sale is made. If desired, each card 48 may be made of or covered with a sheet of plastic material that will accept pencil writing and is erasable. The card contains spaces for the corporation symbol, the number of shares, the price at which the shares were sold, and the total money received by the player making the sale. The cards 48 are preferably of a distinctive color, such as red, to permit ready identification.

The game apparatus further includes a set of PUT cards and a set of CALL cards, which are shown in FIGS. 15 and 16, respectively. The cards, shown at 49 and 52, respectively, may be adapted to receive erasable pencil writing, as described for the Short Sale cards, and provide spaces for the corporation symbol and the price per share. Each PUT card 49 may have a strip 50 of a distinctive color, such as red, along a margin. The CALL cards 52 are identical with the PUT cards with the exceptions that the colored strip 50 is omitted and the word "CALL" is substituted for the word "PUT".

The game apparatus further includes a supply of imitation money 51, shown in FIG. 17, having denominations of $1, $5, $10, $20, $50, $100, $500, $1,000, and $5,000, or greater.

Finally the game apparatus includes a pad of Player's Record Sheets, from which each player is given one for maintaining a record of his transactions and his obligations. This form may be devised as desired and an example thereof is shown at 53 in FIG. 22 of the drawings. In one embodiment, it includes a line for each transaction, and eight columns bearing the following headings: Security, Number of Shares, Price per Share, Total Cost, Amount Paid, Margin (Owed), and two columns headed Subject to Interest. Of the latter, one is headed Short Sales and the other Cumulative.

The apparatus may further include other items for the convenience of the players and the banker, such as an organizer providing compartments for storing imitation money and the various cards. These, being in themselves well known, are not shown in the drawing.

PLAYING THE GAME

1. Preparation

Preliminarily, the Securities Price Board 44 (FIG. 7) is placed within view of all players, to be kept current by the Economist; the designators on the playing board are set initially so that all economic indicators in the fields 17—26 show EVEN and the margin requirement designator or pointer 34 is set to 70 percent. The Opportunity Cards (also herein called action cards) and the News Release Cards are separately shuffled and placed, face down, respectively in the fields 40 and 42. Each participating player selects one of the tokens 14 and places it within the starting space 16 (THE EXCHANGE), receives from the banker a supply of imitation money 51, e.g., $25,000, and takes a Player's Record Sheet as described above, and an individual Corporation Summary Sheet (table IV).

2. General rules

The object of the game is to make money by trading in securities. The winner is the player with the greatest total net worth at the end of the game.

One or more players, e.g., up to ten, can participate. When several play, they determine their playing order by throwing the regular dice 15, the highest playing first, and the others taking positions clockwise in order. Thereafter the players to the left of the one whose turn it is to play receive the following jobs:

1. Broker
2. Economist
3. Poster

Thus, the first player to the left of the one whose turn it is to play first is the Broker, the next player on the left is the Economist, and the next player on the left is the Poster. If there are less than four players these jobs can be combined and performed by two players or one player. A nonparticipating person acts as Banker. Alternatively, these three or four jobs can be permanently assigned to one, two or three players, who do not otherwise participate.

The Banker distributes and collects all monies 51.

The Broker maintains the security cards 47, issues them to buyers, and receives them from sellers, fills out short sales cards 48 and Put and Call option cards 49 and 52.

The Economist maintains the economic indicators in fields 17—26, determines the current economic picture, maintains the margin requirements designator 34, determines the price factor to be used during a market change (using the economic picture as a basis) from the chart 37, performs the multiplication required to determine the price change of a security, and calls out this change, either "Plus" or "Minus", and the name of the corporation and security involved.

The Poster maintains the securities price board 44 by adding or subtracting the figure called out by the Economist from the last prior price for the security involved and writes the new price in the next empty space.

In the foregoing, the economic picture shows the health of the economy and is determined by the algebraic sum of the several conditions of the indicators, counting each UP as +1, each EVEN as 0 and each DOWN as —1. The economic indicators are changed as described below under the "The Play".

Each player must determine himself (as by using the Player's Record Sheet) (1) his dividends, (2) his interest owed, and (3) the amount of money that must be paid when a stock that was bought on margin is sold; further, (4) he must insure that all fiscal transactions are completed as soon as he passes or lands on THE EXCHANGE space, and before he makes any other play.

All transactions are in round lots, i.e., lots of 100 shares.

Options do not have a voting right, collect dividends, or have any value after they expire.

Should any payment due be the fractional part of a dollar, it is rounded off to the nearest dollar, 50 cents being reckoned as $1.

Players may not borrow or lend money or securities to each other or to the Banker, but may buy long or sell short on margin.

The game ends as agreed at its start: either when one player is or all but one are bankrupt (as defined below) or after a predetermined number of circuits, such as two to five, of the path have been completed by at least one player.

3. The Play

Advancing the tokens. The player whose turn it is throws both dice 15 and advances his token 14 in the arrow direction the number of spaces shown on the dice. All instructions represented by the indicia in the new space and/or all trading must be completed before the next player tosses the dice, the play passing to the next player on his left. If a player tosses doubles on the dice, he retains them, and after completing his play as required by that toss, he tosses them again, moving to the new space, etc. A player may retain possession of the dice without penalty, so long as he tosses doubles; or, if agreed upon, he may be limited to only a second toss.

Trading. A player may buy or sell any one or more securities, in any amount (limited by availability of the issued security in possession of the Broker and his ability to pay for them in imitation money), paying cash or, when on margin, at least the percentage indicated by the designator 34, only in his regular turn, after completing the instructions required by the space on which he landed, but he may trade out of turn:

1. When he holds a "buy or sell at anytime" card (see cards Nos. 5 and 6, table II).
2. When he must raise cash to pay interest upon passing or landing on the EXCHANGE space 16.
3. When he must raise cash to cover a margin call.
4. When he must raise cash to buy the required stock on a reverse stock split.
5. When he must purchase stock in a reverse stock split.
6. When another player wishes to buy his stock and the Broker is "sold out" of that stock.

If the Broker is "sold-out" of a security, it can be purchased only from a stockholder.

Options can be purchased only when the player is authorized to do so, e.g., by cards 1 and 2, table II.

Trading in multiple securities. There is no limit to the number of transactions a player may conduct during one turn. However, he may not trade in the same security more than once during any one turn (multiple tosses of the dice counting as separate turns). An exception to this rule is in the exercising of Put or Call Options.

The Exchange. Each time a player lands on or passes THE EXCHANGE space he must pay all interest due and collect all dividends, if any, before the play continues.

Margin Requirements. From time to time the margin requirements, i.e., the partial payment requirements, are changed, pursuant to instructions. Should margin requirements drop, the equity of securities previously purchased on a higher margin requirement must remain at the level required at the time of purchase.

When a stock is sold that was purchased on margin, the margin balance for that stock must be covered i.e., the unpaid balance of the purchase price must be paid.

Opportunity cards dealing with changing the margin requirements and which are drawn but cannot be used because of the current economic picture are put back into the unused portion of the deck and the stack is re-shuffled.

When a player lands on the "Your Margins are Called" space, he must cover immediately his total debt, if any. This does not apply to monies received from short sales. On his next regular turn the player may purchase at the current margin requirements.

Interest. The interest rate on all debts is 5 percent. This includes monies owed because of purchases made on margin and monies received by short sales.

Bankruptcy. All debts must be paid when due, including cash and delivery of stock following short sales. If the player cannot raise cash or purchase the securities in which he is short, he is declared a bankrupt and is out of the game.

Voting. When approval of the shareholders is required, each player casts one vote for each share of common stock he owns. None of the owners of other securities, or who are short in that stock, have voting power.

Buying and selling Opportunity Cards. Players may at any time buy and sell Opportunity cards which are marked "Save this Card" among themselves at mutually agreeable prices.

News Release. When a player's token lands on a space marked "News Release" he takes the uppermost card in the field 42 and reads it aloud; he or the Poster follows its instructions; the card is then placed into the field 43.

Opportunity. When a player's token lands on a space marked "Opportunity" he takes the uppermost card in the field 40 and reads it aloud; he, the Poster, and/or the Economist follow its instructions; the card is then placed into the field 41. The rules stated below are followed, when applicable.

*a* Market Change By Space Method. When a player's token lands on a space marked "Market Change for *****" (one or more specific ticker symbols being stated), he receives from the Economist the proper price factor for the security involved. For example, when the space further reads: "Use economic picture of +3", and the stock is "ACL", the Economist reads from the chart 37 of FIG. 5 in the line +3 and announces the factor of +4. The player then tosses the single die 38 and multiplies the number resulting by the announced factor. The Poster then posts the new price on the Securities Price Board 44, in the next vacant space following the security symbol. For example, if a 2 were thrown, the price would advance by $8 per share. These operations are repeated for each of the stocks specified on the space. If, on the other hand, the space read "Use current economic picture", the Economist would determine the current economic picture by reference to the economic indicators 17—26, as described above, and announce the appropriate factor by reference to the chart 37. The subsequent tossing of the die 38, multiplication and posting are the same.

When the token lands on a space marked "Total Market Change" the same procedure is followed, but there is a separate throw of the die 38 for each security which appears on the chart 37.

If the current economic picture is zero, the price factor for all stocks is +1; therefore the change in price in dollars is the amount shown on the die 38.

If a blank appears on the die 38, the price of the stock is unchanged.

No stock may drop to below 50 percent of its current price by the use of this method of change.

*b* By News Release Method. The price of a security is also altered by the Poster after a player draws a News Release card which indicates a price change. See *e* below for price change to zero.

*c* By Opportunity Card. The price of a security is also altered by the Poster after a player draws an Opportunity card which indicates a price change. In some instances, this card will require the selection of one or more corporations at random, by the use of the corporation die. In this instance, the player who drew the Opportunity card tosses the die 46 and the stock appearing on its uppermost face is selected, if appropriate. If the stock appearing on the uppermost face is not mentioned on the drawn Opportunity Card as one which is to be changed in value, or the stock is bankrupt or has merged, the corporation die 46 is tossed again until an appropriate stock is selected. See *e* below for price change to zero.

*d* By Large-volume Trading. The prices of securities are also changed by the Poster, on the instructions of the Economist, following large-volume trading as required by the chart 39, FIG. 6. For example, if the current price of American Communications Co., Inc. (A) is 67 and one player sells 400 shares, immediately after the sale the Poster lists a new price of $66 for this security.

*e* Limitation on Price Changes. When, in *b. c.* or *d*, above, the price of a security is reduced to zero or less, the Broker declares the corporation bankrupt. All stockholders will immediately return their security cards of that corporation to the Broker. There is no more trading in this security for the remainder of the game, and margin obligations, short positions, PUTS and CALLS in this security must be settled immediately.

Economic Indicator. When a player's token lands on a space marked "Economic Indicator", he throws the die 45. The Economist then changes the designator 31 on the appropriate economic indicator field 17—26 as follows: The field is given by the uppermost face of the die, which also gives the direction of movement of the designator in making a new setting. No change is made when the designator setting was initially that shown on the die.

Some of the Opportunity cards (*e.g.*, cards Nos. 3 and 4, table II) also give the players who draw them the option of changing one or more economic indicators. Any change may be made to the number of indicators allowed by the card(s). However, some change must be made.

Margin Requirements. The Economist changes the designator 34, to indicate the new margin requirement, when a player draws an Opportunity card requiring such a change, (*e.g.*, cards Nos. 9—11, table II).

The various terms used in this game which are not defined herein have the meanings and connotations used in actual stock market operations. These being well known, they are not defined herein. However, the game apparatus would be accompanied by an instruction manual which presents not only the foregoing rules in detail but also definitions of these terms, among which are the following: Bonds, convertible preferred stock, warrants, conversion privilege, puts, calls, straddle options, stock splits, reverse stock splits, margin requirements, short selling, etc.

Further, it is evident that only a concise outline of the playing rules were given in the foregoing, and that these can be modified and augmented without departing from the scope of the invention. Also, changes can be made in the specific indicia wherever they appear.

The game, as described, simulates a real situation and instructs players in understanding and performing the techniques of investing in securities. Novices need not execute the more complex transactions, such as short sales and put and call options.

I claim:

1. In a game apparatus, the combination of:
   a. a game board which has a continuous path divided into a plurality of spaces bearing indicia representing plays to be made and over which tokens are movable to occupy the spaces, a plurality of individual fields each bearing indicia designating a different indicator and indicia showing a plurality of conditions of the respective indicator of a nature to alter the value of a property, and an adjustable designator for each field for designating one of the conditions of the indicator; and
   b. a price change chart bearing names of different properties of different volatilities and a plurality of price change parameters for said properties of different volatilities corresponding to each of a plurality of said conditions of said variable indicators.

2. In combination with the game apparatus according to claim 1, random indicator-selector means for selecting one of said conditions and one of said indicators.

3. In combination with the game apparatus according to claim 1, random number-generating means for generating a number.

4. In combination with the game apparatus according to claim 1, a random property selector for selecting at random a specific property which is listed on the price change chart.

5. In combination with the game apparatus according to claim 1:
   a. a properties price chart which lists a plurality of properties appearing on said price-change chart and provides means for receiving markings displaying a selected price for each said property; and
   b. a random number-generating means for generating a number.

6. In combination with the game apparatus according to claim 1:
   a. a deck of cards bearing indicia giving play instructions, at least one of the plays represented by the indicia in the spaces of the path being an instruction to take one of such cards; and
   b. the instructions represented on the cards of said deck including:
      1. authorization for a player to purchase an option; and
      2. authorization for a player to move a designator for changing the condition of an indicator.

7. The combination according to claim 1 wherein said board includes, additionally, a field bearing indicia representing different partial payment requirements, and an adjustable designator for designating a selected one of said partial payment requirements.

8. In combination with the game apparatus according to claim 1, a deck of cards bearing indicia representing news events which affect the prices of one or more of said properties, at least one of the plays represented by said indicia in the spaces of the path being an instruction to take a card of said deck.

9. In combination with the game apparatus according to claim 1:
   a. a plurality of cards each bearing indicia designating a property, different cards being for different properties;
   b. a plurality of papers bearing indicia and representing money; and c. an account form having spaces thereon for entering, the property purchased or sold by a player and the portion of the total price in excess of that paid for by said papers representing money.

10. In combination with the game apparatus according to claim 1:
   a. a plurality of cards each bearing indicia designating a property, different cards being for different properties;
   b. a plurality of cards bearing indicia representing a short sale of a property; and
   c. a plurality of papers bearing indicia and representing money.

11. In combination with the game apparatus according to claim 1:
   a. a plurality of cards each bearing indicia designating a property, different cards being for different properties;
   b. a plurality of cards bearing indicia representing options to purchase or sell property; and
   c. a plurality of papers bearing indicia and representing money.

12. The game apparatus according to claim 1, wherein said indicators are economic indicators and said properties are securities:
   a. a plurality of papers bearing indicia and representing money;
   b. a random indicator selector for selecting one of said conditions and one of said indicators;
   c. a random number-generating means for generating a number which, when combined with a parameter from the price change chart, yields a price change in a property; and
   d. the indicia in at least one of the spaces of said path representing an instruction to change the price of a property.

13. In combination with the game apparatus according to claim 12:
   a. a random selector means for selecting a specific security listed on said price change chart; and
   b. the indicia in at least one of the spaces of said path representing an instruction to change the price of a property.

14. In combination with the game apparatus according to claim 12:
   a. a deck of cards bearing indicia representing events and giving play instructions, at least one of the plays represented by said indicia in the spaces of the path being an instruction to take one of said cards;
   b. the instructions on at least one of said cards being an instruction to alter a margin requirement; and
   c. said board including, additionally, a field bearing indicia representing different margin requirements, and an adjustable designator for designating a selected one of said margin requirements.